(12) United States Patent
Terdan

(10) Patent No.: US 7,266,000 B2
(45) Date of Patent: Sep. 4, 2007

(54) CONTROLLED INRUSH CURRENT LIMITER

(75) Inventor: Dale R. Terdan, Concord Township, OH (US)

(73) Assignee: Rockwell Automation Technologies, Incl, Mayfield Heights, OH (US)

( * ) Notice: Subject to any disclaimer, the term of this patent is extended or adjusted under 35 U.S.C. 154(b) by 58 days.

(21) Appl. No.: 10/937,717

(22) Filed: Sep. 9, 2004

(65) Prior Publication Data

US 2006/0050541 A1    Mar. 9, 2006

(51) Int. Cl.
*H02M 1/12* (2006.01)

(52) U.S. Cl. ............... 363/48; 363/53; 323/222; 323/908

(58) Field of Classification Search ......... 323/277, 323/283, 284–486, 276, 272; 361/57, 58, 361/93, 111, 93.9, 18, 101; 363/21.12, 71, 363/53, 56, 50
See application file for complete search history.

(56) References Cited

U.S. PATENT DOCUMENTS

| | | | |
|---|---|---|---|
| 4,573,113 A * | 2/1986 | Bauman | 363/48 |
| 5,896,092 A * | 4/1999 | Bechtel | 340/815.73 |
| 5,930,130 A * | 7/1999 | Katyl et al. | 363/53 |
| 6,940,733 B2 * | 9/2005 | Schie et al. | 363/21.12 |

* cited by examiner

*Primary Examiner*—Rajnikant B. Patel
(74) *Attorney, Agent, or Firm*—Keith M. Baxter; R. Scott Speroff

(57) ABSTRACT

An improved inrush current limiting circuit provides continuous control of current delivered to a filter capacitor based on the charge state of the filter capacitor.

24 Claims, 2 Drawing Sheets

CONTROLLED INRUSH CURRENT LIMITER

CROSS-REFERENCE TO RELATED APPLICATIONS

-

STATEMENT REGARDING FEDERALLY SPONSORED RESEARCH OR DEVELOPMENT

-

BACKGROUND OF THE INVENTION

The present invention relates generally to electrical power supply circuits and in particular to circuits for controlling inrush current when power is initially applied to filter capacitors such as those preceding a DC-to-DC converter.

Power supply circuits, such as those for converting between direct current (DC) voltages or between alternating current and direct current of the same or different voltages, may employ one or more filter capacitors used to accommodate varying loads of a switching circuit or power provided by an AC waveform.

Referring to FIG. 1, a typical prior art power supply circuit 10 may include a power source 12, for example, a twelve-volt battery, providing current through a fuse 14 and control switch 16 to a filter capacitor 18.

The filter capacitor 18 may span the input terminals of a load, such as DC-to-DC converter 20, as is well known in the art. The filter capacitor 18 serves to store power to accommodate the fluctuating demands of the DC-to-DC converter 20 and its load 22.

When the power source 12 is initially connected, by closing of switch 16, to an uncharged filter capacitor 18, high inrush currents will pass from the power source 12 to the filter capacitor 18. Typical inrush currents can be ten times the rated current of the DC-to-DC converter 20. These high inrush currents require that the switch 16 be of high current carrying capacity and may require increasing the size of the fuse 14 to a value higher than that which would be preferred for protection of other circuit elements. The high inrush current may also create an arc across the contacts of the switch 16 which can require that the switch be a sealed switch if the environment in which the power supply is being used contains combustible fumes.

Referring still to FIG. 1, high inrush currents may be moderated by placing a negative temperature coefficient (NTC) resistor 24 in series with the current flow to the filter capacitors 18. Such an NTC resistor 24 is initially cool and has a high resistance value limiting inrush current when the power source 12 is first connected. After a period of operation, current flow through the NTC resistor 24 warms it, lowering its resistance.

Variation in the resistance of the NTC resistor 24 combined with variation in the voltage of the power source 12, for example, a lead acid battery, make the maximum inrush current difficult to characterize. If the switch 16 is cycled off and then on again, a high inrush current will occur if the capacitor 18 has discharged but the NTC resistor 24 has not cooled. The NTC resistor 24 continually dissipates power, reducing the efficiency of the power supply circuit 10 and reducing the charging rate of the capacitor 18 more than necessary as a result of inevitable mismatch between heating and charging rates.

Referring to FIG. 2, the problems of power dissipation and unpredictable maximum inrush current can be reduced by using a fixed resistor 26 to limit inrush current and shunting this fixed resistor 26 with a transistor 28 after a time delay, effectively removing the resistor. A timer 32 is triggered by a signal from the DC-to-DC converter 20 or switch 16 and turns on transistor 28 shorting resistance 26 after a time delay during which it may be assumed that filter capacitor 18 has been fully charged. The transistor 28 is operated in fully "on" or "off" states so as to minimize its power dissipation This approach still presents the risk that a cycling of switch 16 could create high inrush currents. And, although the fixed resistor reduces variation in maximum inrush current caused by the variability of the NTC resistor 24, maximum inrush currents will still vary as a function of the voltage of the source 12. The time delay of timer 32 must be set to a compromise value that inevitably reduces the charging speed of the capacitors more than necessary.

BRIEF SUMMARY OF THE INVENTION

The present invention provides an inrush limiting circuit that directly monitors the charge state of the filter capacitor and controls the maximum inrush current based on that charge state. Maximum inrush current can be well defined by the functional dependency established between charge state and current flow (with a known capacitance value) and problems of switch cycling are eliminated because the capacitor charge state is measured directly.

The circuit provides continuously variable control of inrush current flow allowing more effective and faster charging of the capacitor, and because the current controlling device (a transistor) is placed in series with the capacitor 18 and power source 12, the same circuit that controls inrush current controls the power dissipated by the transistor protecting the transistor itself.

Specifically, the present invention provides an inrush current limiter circuit for controlling inrush current flow when a power source is connected to a filter capacitor supplying a load. The inrush current limiter circuit includes a solid-state current control element connected in series between the power source and the filter capacitor, the current control element having a control input to control current flow through the solid-state current control element. A filter capacitor charge sensor senses a state of charge of the filter capacitor and communicates with the control input of the current control element to allow greater current flow through the current control element as charge on the filter capacitor increases.

It is thus one object of at least one embodiment of the invention to provide a sophisticated control of inrush current that looks directly at the filter capacitor charge state rather than proxy such as time or historical current flow.

The circuit may include a current sensor communicating with the control input of the current control element to reduce current flow through the current control element as current through the current control element increases.

It is thus another object of at least one embodiment of the invention to provide concurrent current control regardless of the state of the filter capacitor.

The current sensor may provide an input to the control input of the current control element to limit a maximum current flow through the switch element.

Thus it is another object of at least one embodiment of the invention to provide an absolute maximum limit to inrush current.

The current sensor may include a sensing resistor positioned to conduct the inrush current to produce a voltage proportional to the inrush current.

It is thus another object of at least one embodiment of the invention to provide a direct and stable measurement of current, avoiding variations in maximum inrush current as a function of temperature or time.

The sensing resistor may be positioned at an emitter of a first transistor of a current mirror to control current flow through a second transistor of the current mirror, the second transistor controlling the input of the current control element.

It is thus another object of at least one embodiment of the invention to provide a simple current sensing circuit that may handle high current measurements with extremely low in-line resistance, and accordingly, low voltage drop.

The circuit may include a voltage limiter on the control input of the current control element, for example, a zener diode.

It is thus another object of at least one embodiment of the invention to provide for a redundant mechanism to limit absolute current flow.

The circuit may include a user-operated switch communicating with the control input of the current control element, and switchable to provide an input to the control input causing a blocking of current flow through the current control element.

It is thus another object of at least one embodiment of the invention to provide a method of controlling power flow between a power source and filter capacitors in the context of an inrush current limiter that does not require a high current rating switch or present risk of significant arcing.

The filter capacitor charge may be determined by sensing a voltage on a terminal of the filter capacitor.

It is thus another object of at least one embodiment of the invention to provide a simple mechanism for charge state determination.

These particular objects and advantages may apply to only some embodiments falling within the claims and thus do not define the scope of the invention.

DETAILED DESCRIPTION OF THE PREFERRED EMBODIMENT

Figure 3:
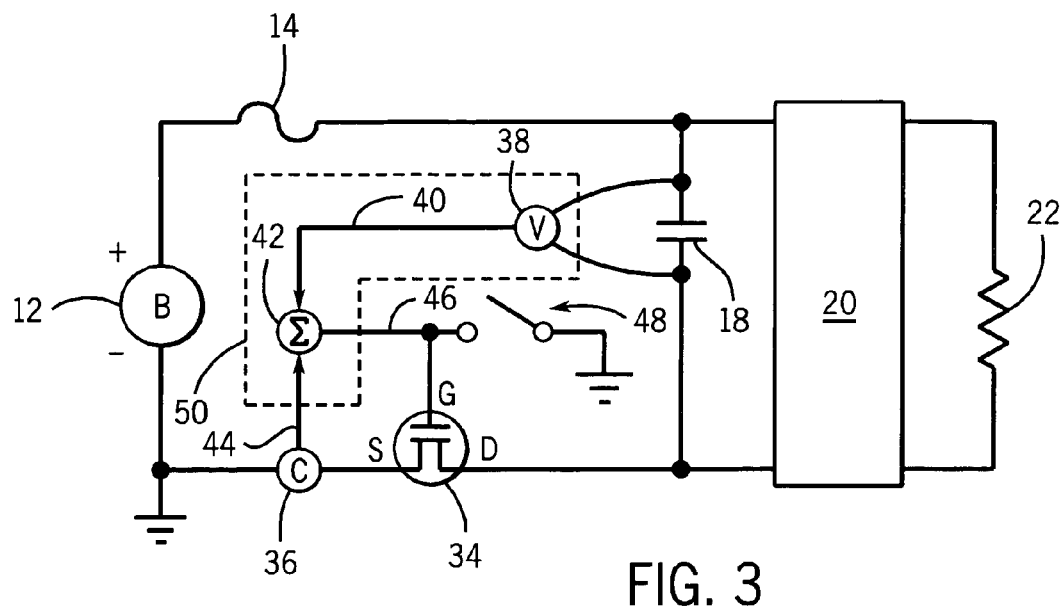
FIG. 3 is a schematic representation of the current limiting circuit of the present invention which directly monitors charge state of the filter capacitor.

Referring now to FIG. 3, in the present invention, a power source 12, such as a battery providing twelve or twenty-four volts of electricity, may have a positive terminal connected with a first terminal of a fuse 14 and a second terminal defining a ground point.

The second terminal of the fuse 14 is connected directly to a first terminal of a filter capacitor 18 shunting, for example, input terminals of a DC-to-DC converter 20 or other load. The second terminal of the filter capacitor 18 may be connected to the drain terminal of a field effect transistor (FET) 34 and the source terminal of this transistor 34 may be connected through a current sensing circuit 36 to ground.

A voltage sensing circuit 38 may communicate with the capacitor 18 to measure the voltage across the capacitor which, in conjunction with the known capacitance value of the capacitor 18, indicates a state of charge of the capacitor 18.

The voltage sensing circuit 38 provides a voltage value 40 to a control function generator 42 which also receives a current value 44 from the current sensing circuit 36. The control function generator 42 then provides an output to the gate terminal of the field effect transistor 34 that is a function of the voltage value 30 and the current value 44. Generally, the control function generator 42 increases the gate voltage of transistor 34 as the voltage across the filter capacitor 18 increases, that voltage indicating increased charging of the filter capacitor 18. In this way, faster charging of the capacitor 18 is allowed as the filter capacitor 18 charges. The control function generator 42, by appropriate setting of its function parameters, may thus provide an extremely rapid charging of filter capacitor 18 within the limits of power dissipation of the transistor 34.

As mentioned above, the output signal 46 from the control function generator 42 is also a function of charging current sensed by the current sensing circuit 36. In this case, the control function generator 42 decreases the gate voltage of transistor 34 as a function of charging current flow between the drain and source terminals of the transistor 34. It will be understood that this functional relationship limits maximum current flow through the transistor 34 and with the proper setting of the function of the control function generator 42 can limit maximum inrush current independently of the charging of capacitor 18.

Generally the function of the control function generator 42 is set to provide a maximum inrush current and for currents less than this maximum, a maximum power dissipation across transistor 34. Voltage sensing circuit 38, control function generator 42, and current sensing circuit 36, generally, provide a controller 50 providing continuous adjustment to the current flow through transistor 34 to limit inrush currents while maximizing charging rate of the capacitor 18.

Figure 1:
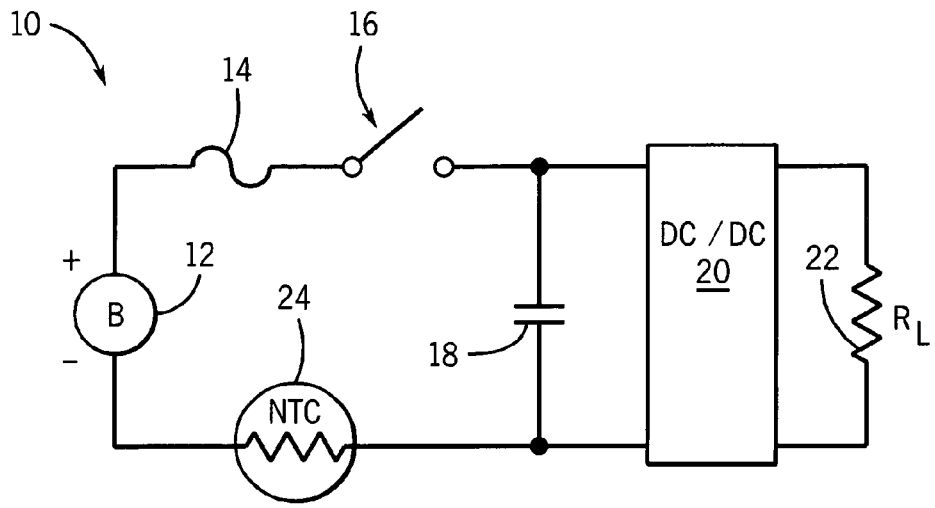
FIG. 1 is a schematic representation of a current limiting circuit of the prior art as described above in the Background of the Invention.
Figure 2:
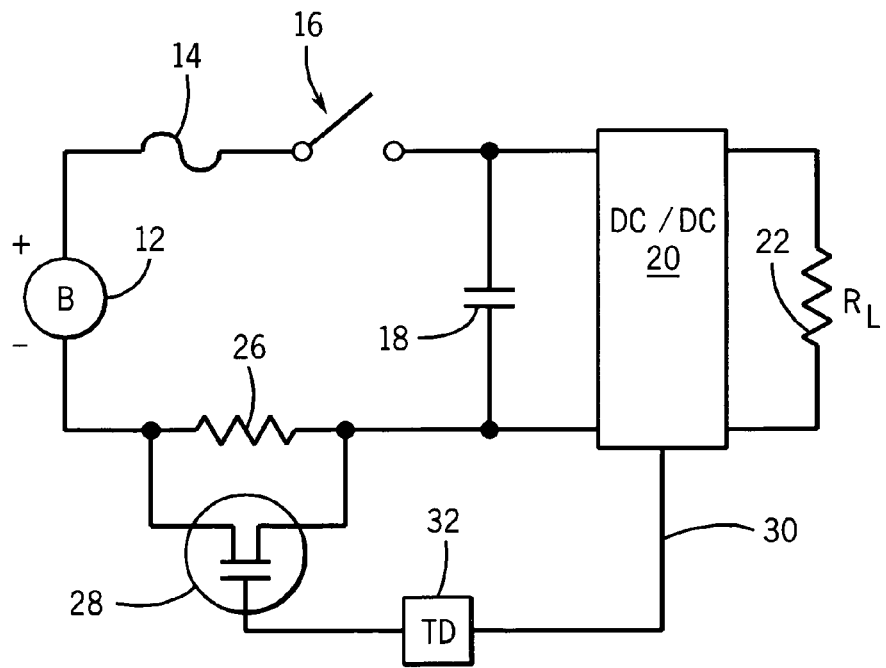
FIG. 2 is a schematic representation of a second prior art current limiting circuit also described above in the Background of the Invention.

A switch 48 may switchably connect the gate of the transistor 34 to ground allowing the transistor 34 to stop all current flow between the power source 12 and the capacitor 18 thus providing an on-off function similar to the switches 16 in FIGS. 1 and 2. On the other hand, because the switch 48 does not directly conduct the inrush current but only controls the transistor 34, the switch 48 does not need to have a high current rating or the ability to suppress arcs that will not be present with the typically low currents conducted by the switch 48.

Figure 4:
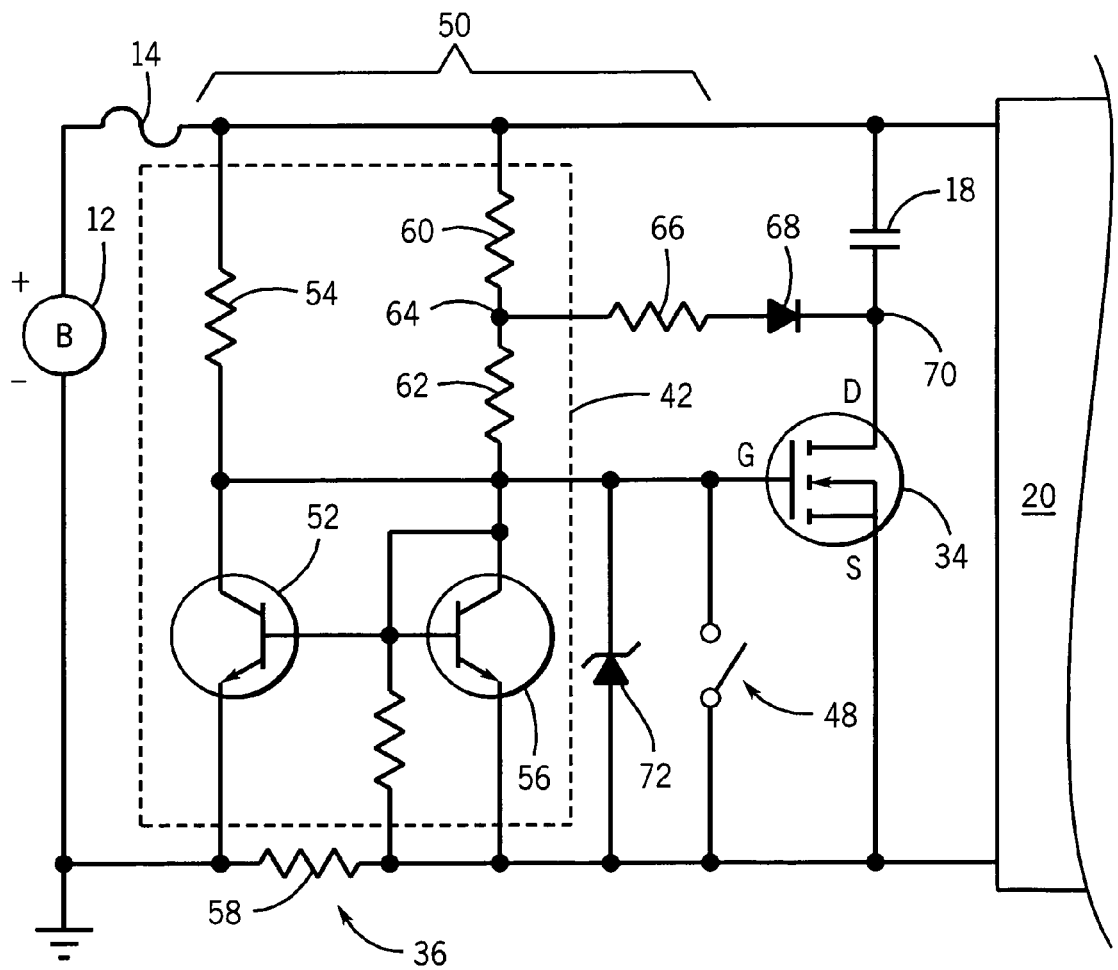
FIG. 4 is a detailed schematic of the simplified schematic of FIG. 3 showing additional circuit details.

Referring now to FIG. 4, the gate of transistor 34 may connect to the junction of a collector of transistor 52, and collector resistor 54. The remaining terminal of collector resistor 54 may connect to the fuse 14 (and hence to the positive terminal of the power source 12) and the emitter of transistor 52 may connect to ground. It will be understood that the voltage on the gate terminal of transistor 34 will thus be determined by the amount of current drawn by transistor 52 through its collector with the gate voltage dropping and the current through transistor 52 increases.

Transistor 52 forms a current mirror with transistor 56, each transistor being matched NPN bipolar transistors having their bases connected together and transistor 56 also having its base and collector connected together. It will be understood to those of ordinary skill in the art that normally, with both emitters connected to ground, current passing through the collector of transistor 56 will be mirrored by the current passing through the collector of transistor 52. This condition is altered in the present invention by the introduction of a current sensing resistor 58 positioned between the emitter of transistor 56 and ground. This current sensing resistor 58 will be a relatively low resistance value (milliohms) and will be in series between the source of transistor 34 and ground to conduct the entire current passing from the power source 12 to the capacitor 18 (inrush and normal operating currents).

The voltage across sensing resistor 58 will thus add to the voltage drop across the base-emitter junction of transistor 56 causing a relative increase in the current flow through the collector of transistor 52 with respect to the current flow through the collector of transistor 56 when additional current flows through sensing resistor 58 increasing the voltage drop across sensing resistor 58.

Because increased current flow through transistor 52 generally decreases the gate voltage on transistor 34, it will be understood that this provides negative feedback causing the transistor 34 to increasingly restrict current flow as total current flow increases as described above.

The baseline current through current mirror transistor 56, that is, before modification by sensing resistor 58, is set by two series resistors 60 and 62 joined at a junction 64 with the remaining terminal of resistor 60 connected to the positive terminal of the power source 12 (through fuse 14), and the remaining terminal of resistor 62 connected to the collector of transistor 56. A voltage sensing resistor 66 is attached to junction 64 and its remaining terminal attached to the anode of a diode 68 whose cathode attaches to junction 70 being the ground side terminal of filter capacitor 18.

When filter capacitor 18 is uncharged, the voltage at the junction 70 is substantially equal to the positive voltage of the power source 12, and thus no current is drawn through the voltage sensing resistor 66 leaving the normal current flow through resistors 60 and 62 at a baseline value. Ignoring for the moment the effect of sensing resistor 58, this provides a corresponding baseline current through transistor 52 and baseline voltage at the gate of transistor 34 and hence baseline current limit to the charging of capacitor 18.

As filter capacitor 18 charges up through transistor 34, the voltage at junction 70 will drop causing additional current to be drawn through resistor 66 away from resistor 62 and transistor 56. This, in turn, decreases the current passed by transistor 52 raising the gate voltage on transistor 34 increasing the limit to current charging the filter capacitor 18.

An absolute limit to the gate voltage of transistor 34 is provided by the introduction of a zener diode 72 positioned between the gate and source of the transistor.

During and after capacitor 18 is charged, an absolute limit to the charging current is controlled by the combination of the current sensing resistor 58 providing a base current to control transistor 52 through the base emitter resistor across control transistor 56. The control transistor 52 will reduce the gate voltage on transistor 34 as the base emitter of transistor 52 is increased.

It will be understood that because the present invention monitors the charge state of the filter capacitor 18 directly, that rapid switching of switch 48 from off to on again, will not adversely affect control of inrush current which is determined by the charge state of filter capacitors 18. The use of sensing resistor 58 provides a robust current sensing standard to limit the current flow independent of temperature or battery voltage.

In the preferred embodiment, the voltage of junction 70 is also the voltage across the drain and source of transistor 34 and thus the present circuit operates, in practice, to limit the total power dissipated across transistor 34 by limiting the total current flow through transistor 34 as a function of voltage across transistor 34. Thus, the present invention can provide continuous control of current while protecting the transistor 34 from excessive power.

It is specifically intended that the present invention not be limited to the embodiments and illustrations contained herein, but include modified forms of those embodiments including portions of the embodiments and combinations of elements of different embodiments as come within the scope of the following claims.

I claim:

1. An inrush current limiter circuit for controlling inrush current flow when a power source is connected to a filter capacitor supplying a load, the inrush current limiter circuit comprising:

a solid-state current control element connected in series between the power source and the filter capacitor, the solid-state current control element having a control input to control current flow through the solid-state current control element; and a filter capacitor charge sensor sensing a state of charge of the filter capacitor to produce a signal indicating the state of charge of the capacitor and communicating that signal to the control input of the solid-state current control element to provide greater current flow through the solid-state current control element as charge on the filter capacitor increases;

wherein the filter capacitor charge sensor changes the control input of the solid-state current control element as the filter capacitor charges to provide continuous adjustment to the current flow through the solid-state current control element and substantial conduction through the solid-state current control element as the filter capacitor charges.

2. The inrush current limiter circuit of claim 1 further including a current sensor communicating with the control input of the solid-state current control element to reduce current flow through the solid-state current control element as the current through the solid-state current control element increases.

3. The inrush current limiter circuit of claim 2 wherein the current sensor provides an input to the control input of the solid-state current control element to limit a maximum current flow through the solid-state switch element.

4. The inrush current limiter circuit of claim 2 wherein the current sensor includes a sensing resistor positioned to conduct the inrush current to produce a voltage proportional to the inrush current.

5. The inrush current limiter circuit of claim 4 wherein the sensing resistor is positioned at an emitter of a first transistor of a current mirror to control current flow through a second transistor of the current mirror, the second transistor controlling an input of the solid-state current control element.

6. The inrush current limiter circuit of claim 1 further including a limiter communicating with the control input to limit a maximum inrush current through the solid-state current control element.

7. The inrush current limiter circuit of claim 6 wherein the voltage limiter is a zener diode connected to the control input of the solid-state current control element.

8. The inrush current limiter circuit of claim 1 further including a user operated switch communicating with the control input of the solid-state current control element and switchable to provide an input to the control input causing a blocking of current flow through the solid-state current control element, the user operated switch positioned so as not to conduct the inrush current therethrough.

9. The inrush current limiter circuit of claim 1 wherein the load is a DC-to-DC converter.

10. The inrush current limiter circuit of claim 1 wherein the filter capacitor charge sensor senses voltage on a terminal of the filter capacitor.

11. The inrush current limiter circuit of claim 1 wherein the solid-state current control element is an insulated gate transistor.

12. A method of controlling inrush current to filter capacitors comprising the steps of:
   (a) measuring a state of charge of the filter capacitors; and
   (b) controlling inrush current to the filter capacitors based on the measured state of charge such that when the filter capacitors are less charged, the inrush current is relatively more limited and when the filter capacitors are more charged, the inrush current is relatively less limited and such that the inrush current is continuously adjusted as a function of state of charge of the filter capacitors.

13. The method of claim 12 further including the steps of:
   (c) sensing current flow between a power source and filter capacitor; and
   (d) limiting current to the filter capacitors based on the inrush current so that the inrush current is resisted more when the inrush current is higher.

14. The method of claim 13 further including the step of limiting maximum current flow.

15. The method of claim 13 wherein the current flow is sensed with a fixed resistor.

16. The method of claim 12 further including the step of:
   limiting current to the filter capacitors with a user operated switch positioned to not conduct the inrush current therethrough.

17. The method of claim 12 wherein the state of charge of the filter capacitor is sensed by measuring a voltage on a terminal of the filter capacitor.

18. The method of claim 12 wherein the current is limited by an insulated gate transistor.

19. An inrush current limiter circuit for controlling inrush current flow when a power source is connected to a capacitive load, the inrush current limiter circuit comprising:
   a current controlling inrush transistor positioned in series between the capacitive load and the power source to provide a current therethrough and a voltage thereacross, the current controlling inrush transistor having a control input to control current flow through the inrush transistor; and
   a controller attached to the control input to monitor the voltage and the current of the inrush transistor to limit the current as a combined function of the current and voltage to provide control continuously varying the current flow through the current controlling inrush transistor to maximize the charging rate of the capacitive load for a given current limit.

20. The inrush current limiter circuit of claim 19 wherein the controller provides a first operation range in which the current is controlled continuously as a function of the voltage and current and a second operation range where the current is limited to a maximum current amount.

21. The inrush current limiter circuit of claim 20 wherein the controller senses current using a fixed resistor positioned to conduct the inrush current to produce a voltage proportional to the inrush current.

22. The inrush current limiter circuit of claim 21 wherein the fixed resistor is positioned at an emitter of a first transistor of a current mirror to control current flow through a second transistor of the current mirror, the second transistor of the current mirror controlling an input of the inrush transistor.

23. The inrush current limiter circuit of claim 20 wherein the controller senses voltage using a fixed resistor communicating with a terminal of the inrush transistor and diverting current from a current-to-voltage converter attached to the control input of the inrush transistor.

24. The inrush current limiter circuit of claim 19 further including a user operated switch overriding inputs to the control input of the inrush transistor to turn off the inrush transistor.

* * * * *